Jan. 12, 1926. 1,569,078
M. S. ELTON ET AL
MEANS FOR MAINTAINING A RESERVE IN FUEL TANKS
Filed April 28, 1925   3 Sheets-Sheet 1
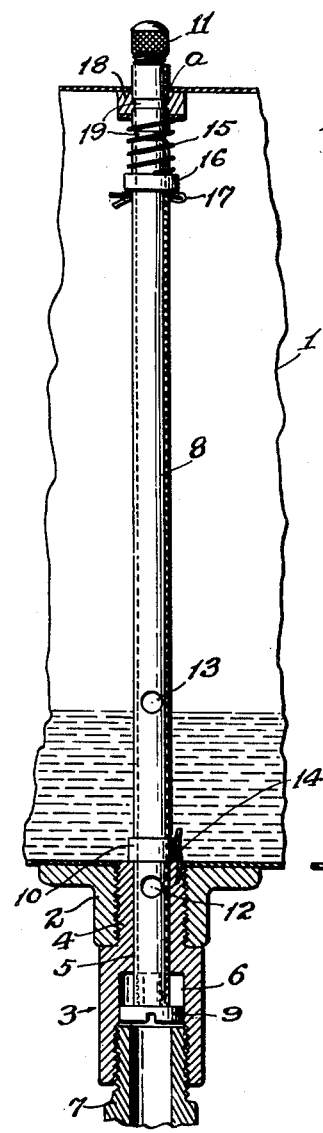
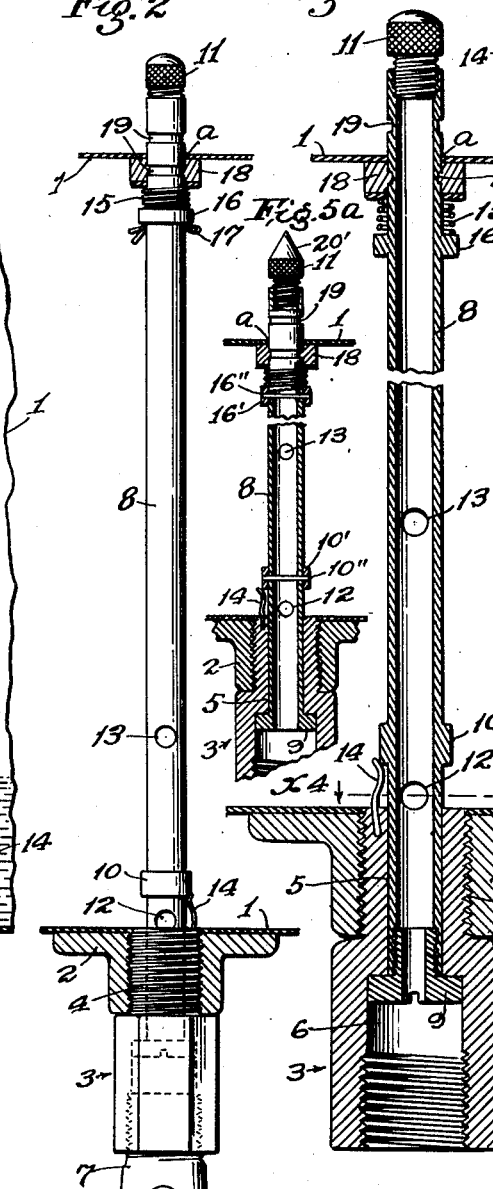
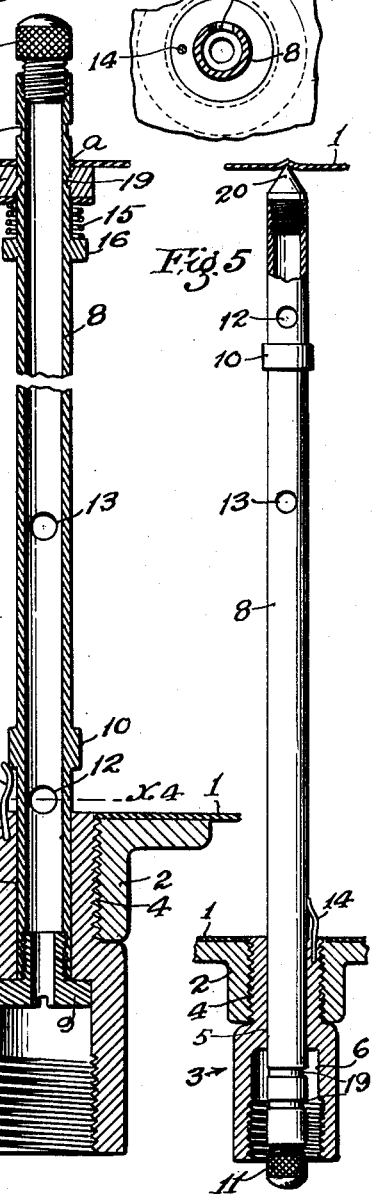
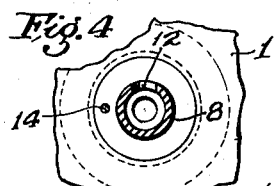
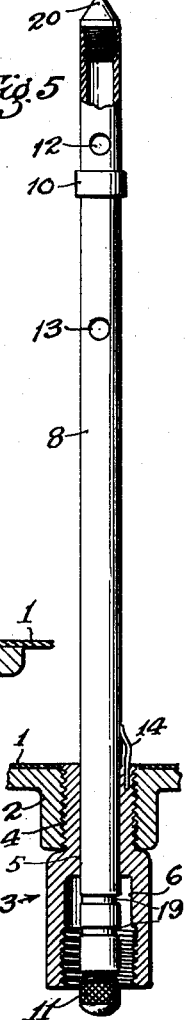

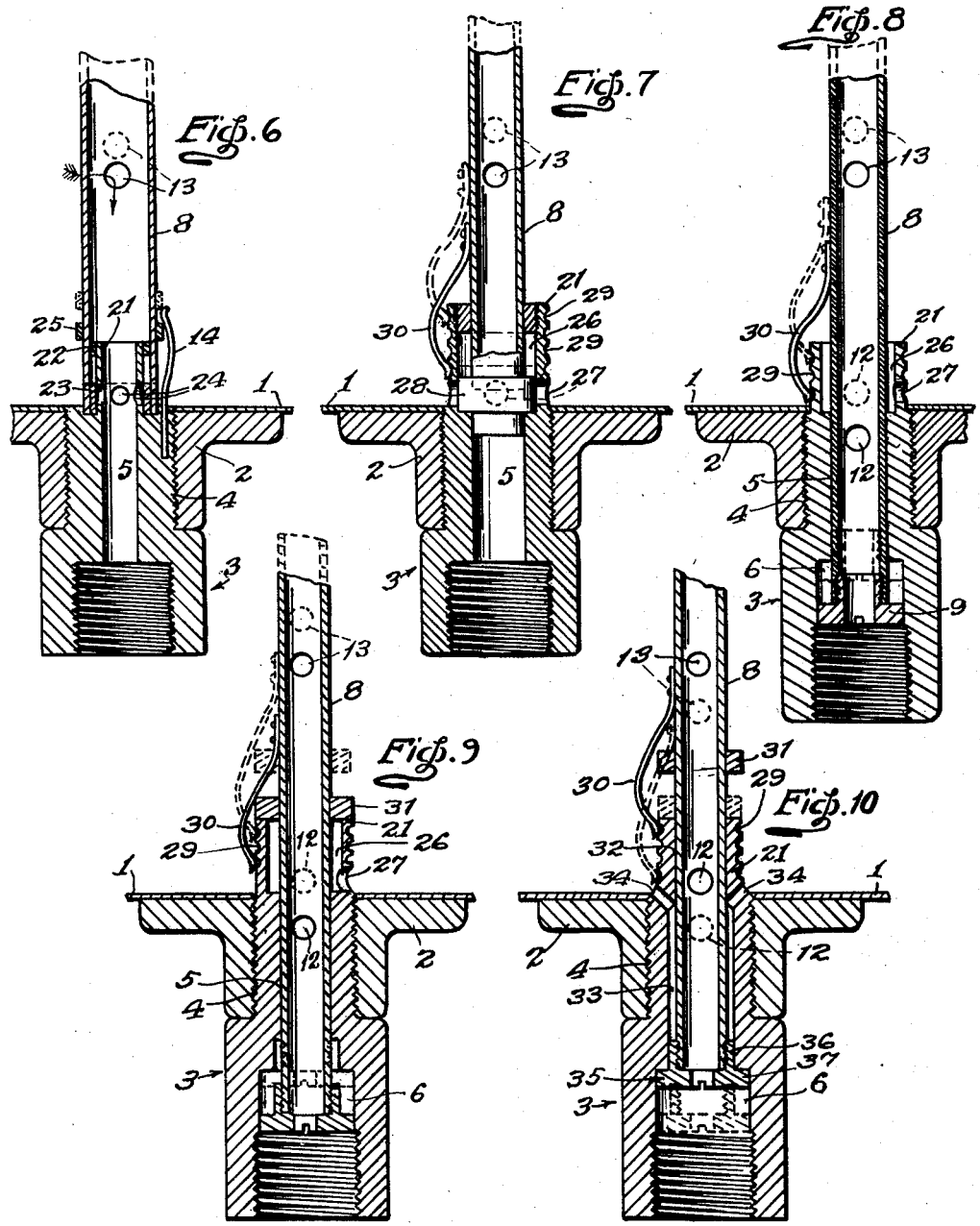

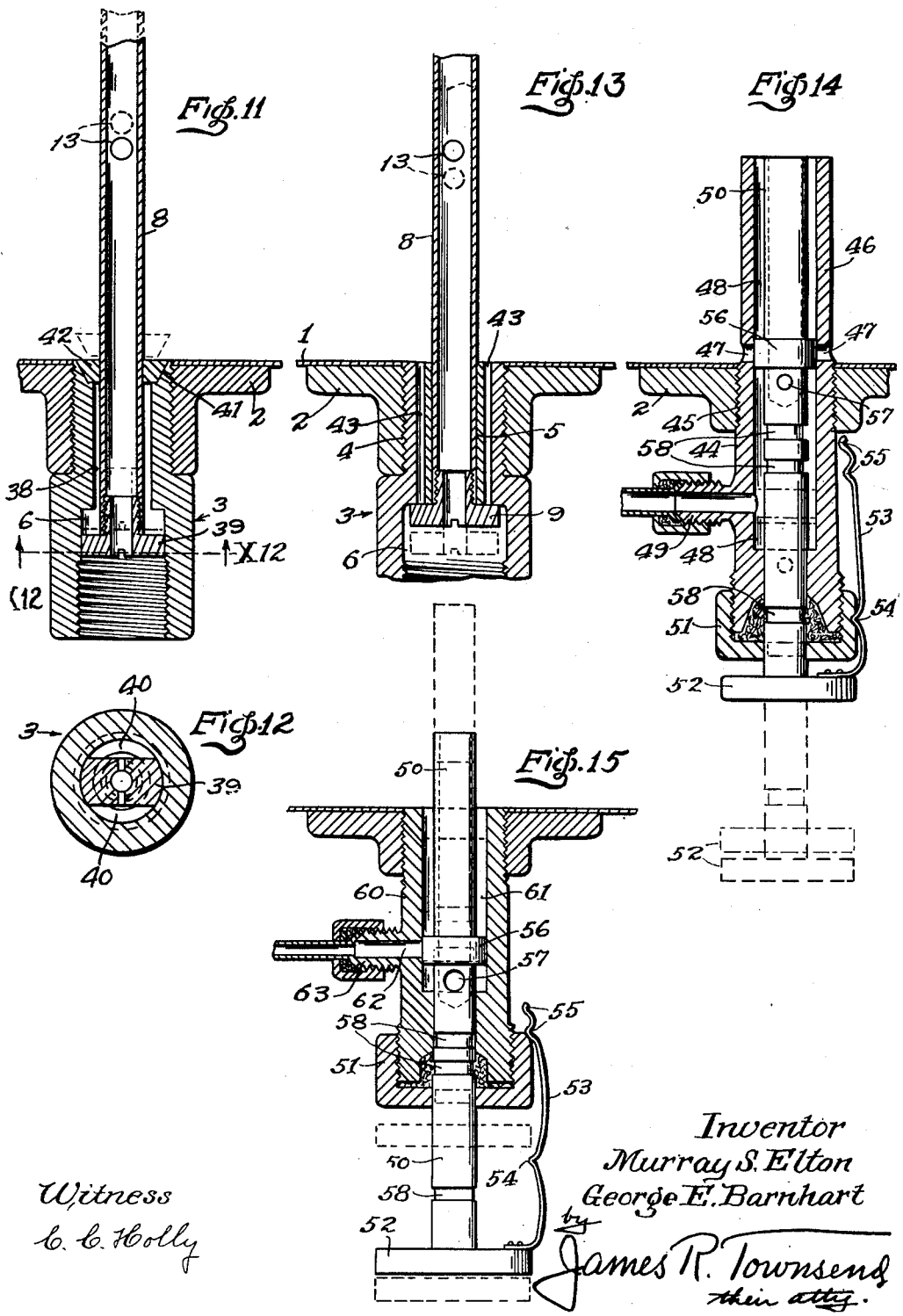

Patented Jan. 12, 1926.

1,569,078

UNITED STATES PATENT OFFICE.

MURRAY S. ELTON AND GEORGE EDWARD BARNHART, OF PASADENA, CALIFORNIA.

MEANS FOR MAINTAINING A RESERVE IN FUEL TANKS.

Application filed April 28, 1925. Serial No. 26,554.

*To all whom it may concern:*

Be it known that we, MURRAY S. ELTON and GEORGE EDWARD BARNHART, both citizens of the United States, residing at Pasadena, in the county of Los Angeles and State of California, have invented a new and useful Means for Maintaining a Reserve in Fuel Tanks, of which the following is a specification.

This invention relates to that type of fuel reserve regulator, particularly applicable to motor vehicle fuel tanks, and the prime object is to provide a novel regulator, which may be manually adjusted to maintain or tap a reserve supply of fuel.

An object is to provide yieldable means maintaining the regulator in reserve supply position.

A further object is to provide automatic means holding the regulator in reserve tapping position, after it has been manually adjusted to said position.

Another object is to provide a regulator which is simple in construction, inexpensive to manufacture, and easy to install.

A still further object is to provide means on the regulator, whereby it may be used as a tool to determine the location of holes for its installation.

A still further object is to provide novel means that may be used for maintaining and permitting access to a reserve supply of fuel and which means may also be used for indicating the exact place of mounting the same in the tank.

Another object is to provide a novel device of the character set forth which does not require a packing gland below the level of the liquid.

Other objects, advantages and features of invention may appear from the accompanying drawings, the subjoined detailed description and the appended claims.

The accompanying drawings illustrate the invention.

Figure 1 is a side elevation of our regulator, in reserve maintaining position, the fittings being shown in section.

Fig. 2 is a view similar to Fig. 1, with the regulator in reserve tapping position.

Fig. 3 is a longitudinal sectional view of a slightly modified form of a regulator, on a slightly larger scale than Figs. 1 and 2.

Fig. 4 is a sectional view taken on line $x^4$, Fig. 3.

Fig. 5 is a side view of our regulator, with parts broken away, and being used as a tool to locate the hole for the installation thereof.

Fig. 5$^a$ is a side view on reduced scale of a modification of the tube adapted for use as a center punch.

Fig. 6 is a fragmentary sectional view of a slightly modified form of our indicator.

Fig. 7 is a fragmentary sectional view of another modified form of indicator.

Fig. 8 is a fragmentary sectional view of a further modified form.

Fig. 9 is a fragmentary sectional view of still another modified form.

Fig. 10 is a fragmentary sectional view of a still further modified form.

Fig. 11 is a fragmentary sectional view of yet another modified form.

Fig. 12 is a sectional view taken on line $x^{12}$, Fig. 11.

Fig. 13 is a fragmentary sectional view on another modified form.

Fig. 14 is a fragmentary sectional view of a further modified form.

Fig. 15 is a fragmentary sectional view of another modified form.

The tank 1 has an internally threaded outlet boss 2 on the bottom thereof, into which an outlet fitting 3 extends. This fitting has a reduced threaded section 4, which threads into the boss 2, and a bore 5 extending through said section.

An enlarged longitudinal bore 6 extends from the bottom of the fitting and communicates with the bore 5, and the usual pipe line coupling 7 threads into said bore 6.

A fuel regulator tube 8 extends through the bore 5, through the top of the tank 1 and into the bore 6.

A hollow cap 9 is threaded into the lower end of the tube 8, and fits the bore 6, by engaging the upper end of said bore the cap limits the upward movement of the tube.

A ring 10 formed on the tube 8 and spaced from the bottom thereof engages the upper end of the fitting 3, to limit the downward movement of said tube.

A knurled knob 11 is threaded into the top of the tube 8, and provides means whereby the tube may be adjusted.

A port 12 is provided in the tube 8 and spaced below the ring 10, and a second port 13 in the tube is spaced above the ring. The port 12 is spaced below the ring 10 about the same distance that the tube 8 extends into the bore 6.

Thus in the raised position of the tube with the cap 9 engaging the top of the bore the port 12 will be about on the level of the bottom of the tank 1, and the tank will be drained through the tube into the pipe coupling 7.

In the lowered position of the tube the port 12 is covered in the bore 5, and the tank will be drained only to the level of the port 13, which is spaced any desired distance above the bottom of the tank.

A spring catch 14 is set into the top of the fitting 3 and rises therefrom to engage the top of the ring 10 to hold the tube in lowered position, or the bottom of the ring 10 to hold the tube in raised position.

A coil spring 15 encircles the tube 8 and bears against a collar or stop 16, which may be integrally formed with the tube or may slide thereover and be held in place by a key 17.

The tube 8 extends through a resilient washer packing 18 such as felt, at its upper end, and the spring 15 bears against it to hold said packing against the top of the tank.

Annular grooves 19 are formed in the tube 8 in the space traversed by the packing 18, and the packing contracts into the grooves thus holding the tube in either raised or lowered position, and such holding means may be used independently of the spring 14 if desired or may be used in combination therewith.

To properly align the hole *a* through the top of the tank 1 with the bore 5, we use the tube 8 as a center punch by providing means thereon that may be used to indicate or form the hole *a*. Preferably the cap 9 is unthreaded and a pointed tip 20 is threaded in its place. The tube 8 is inverted and extended through the fitting 3 as shown in Fig. 5.

By striking the knob 11 the top of the tank is dented or perforated by the point 20 and may be accurately bored so that the tube will operate properly without binding in the bore 5, or the point 20 may be entirely forced through the tank 1 and form a hole *a* that is adapted to receive the tube 8 without requiring drilling of such hole.

In Fig. 5ª the point 20' may be formed integral with the knob 11 or threaded to the tube 8 in the same manner as the knob 11, and the collars 10' and 16' are slidable on the tube 8 and are fixed thereon by pins 10" and 16", respectively. The cap 9 may also be formed integral with the tube 8.

In using the tube 8 shown in Fig. 5ª as a center punch the pins 10" and 16" are withdrawn thereby permitting the tube 8 to slide through the bore 5. The fitting 3 is then threaded to the boss 2 and the point 20' brought into engagement with the tank 1; by striking the cap 9 the point 20' is forced through the tank or dents the same as the case may be. The fitting 3 is then removed and the collars secured to the tube 8 by the pins 10" and 16" and the device is then inserted in position in the tank.

In the modifications shown in Figs. 6 to 10 inclusive, the fitting 3 is provided with an extension 21 which rises into the tank 1. In Fig. 6 the extension has a stop ring 22 adjacent the top thereof.

The tube 8 slides over the ring 22 and a stop collar 23 at the bottom of the tube is adapted to engage the ring to limit the upward movement of the tube. Ports 24 extend through the side walls of the extension 21 at the level of the bottom of the tank, and are covered by the collar 23 in the lowered position of the tube 8. The usual high level or reserve intake port 13 is provided in the tube 8 as already described.

To hold the tube in the raised or lowered position the spring catch 14 engages a collar 25 on the tube in a similar way to that already described.

In this modification the tube 8 extends to the bottom of the tank and in the lowered position covers the ports 24, draining through port 13 and thus maintaining a reserve supply as already described. By raising the tube the ports 24 are opened and the tank may be entirely drained through such ports 24.

In Figs. 7, 8 and 9 the extension 21 is provided with a bore 26, which is greater in diameter than the bore 5. Ports 27 are formed in the side wall of the extension 21 at the level of the bottom of the tank, and in Fig. 7 a head 28 is formed or secured on the tube 8, which accurately fits the bore 26.

In the lowered position of the tube the head rests against the bottom of the bore 26 and covers the ports 27, which permits passage of liquid through the port 13 only. By raising the tube and head 28 the ports 27 are opened and the tank may be drained.

In Figs. 7 to 10 inclusive the extension 21 is provided with a plurality of superposed annular grooves 29, into which a spring catch 30, secured to the tube 8, is adapted to fall to hold the tube in its raised or lowered position.

In Fig. 8 the tube 8 is constructed as previously described for Figs. 1-5, and the bore 12 is positioned in the enlarged bore 26 in the raised position to drain the tank.

In Figs. 9 and 10 a stop collar 31 on the tube 8 engages the top of the extension 21 to limit the downward movement of said tube. The operation of the construction shown in Fig. 9 is the same as that shown in Fig. 8.

In the modification shown in Fig. 10, the extension 21 is bored, as at 32, so that the tube 8 accurately fits therein. Below the bore 32 and above the bore 6, the fitting is provided with a bore 33 of greater diameter than the tube 8, and a duct 34 extends into the bore 33 through the fitting 3 from a point at the lower level of the tank.

A hollow cap 35 is threaded on the lower end of the tube 8 and the shank 36 thereof accurately fits the bore 33, and the head 37 thereof accurately fits the bore 6.

In the raised position of the tube 8 the port 12 is in the bore 32, and the cap 35 closes the lower part of the bore 33 so that liquid can only pass through the port 13. By lowering the tube 8, the port 12 is positioned in the bore 33 and liquid flows therethrough to drain the tank.

In the modified form shown in Figs. 11, 12 the fitting 3 is provided with a longitudinal bore 38 extending from the top thereof to the bore 6, which is greater in diameter than the tube 8 extending therethrough.

A hollow cap 39 is threaded into the bottom of the tube 8, and the head thereof is cut away as at 40 to provide a passage. A valve seat 41 is formed in the top of the fitting 3, and a valve 42 on the tube 8 rests therein, in the lowered position of said tube.

When the tube is raised, unseating the valve 42 the liquid flows through the bore 38, past the cap 39 into the pipe line.

In Fig. 13, the fitting 3 is provided with a plurality of longitudinally extending ducts 43, which extend from the top of said fitting to the bore 6. The tube 8 extends through the bore 5 and the cap 9 is threaded into the lower end of said tube, all as previously described.

In the raised position of the tube 8 the cap 9 rests over the lower end of the ducts 43 to prevent liquid from flowing therethrough. By lowering the tube 8 the ducts are opened and the liquid flows therethrough to drain the tank.

In Fig. 14, a fitting 44 is threaded at 45 into the boss 2. An extension 46 on said fitting rises into the tank 1, and ports 47 extend through the side walls of said extension adjacent the bottom of the tank.

A longitudinal bore 48 extends from the top of the fitting 44 to adjacent the lower end thereof. An outlet nipple 49 is formed on the side of the fitting 44 and communicates with the bore 48 adjacent the lower end thereof, and the outlet pipe is suitably connected thereto.

A tube 50 extends through the lower end of the fitting 44, into the bore 48 and through a packing gland 51 on the lower end of the fitting.

A head 52 closes the lower end of the tube 50, and a spring 53 secured thereto holds the tube in adjusted position. The spring 53 has a kink 54 adjacent the lower end thereof and kinks 55 adjacent the upper end thereof.

These kinks are adapted to engage the packing gland 51 to hold the tube in adjusted position.

A collar 56 on the tube 50 closely fits the bore 48 and in the raised position of the tube is adapted to cover the ports 47. A port 57 extends through the side wall of the tube below the collar 56. Thus in the position shown in solid lines Fig. 14, the liquid flows into the top of the tube 50 through the port 57 out of the nipple 49 and into the pipe.

By lowering the tube the ports 47 are opened and the tank may be drained. Annular grooves 58 in the tube 50, provide additional holding means for the tube in that the packing in the gland 51 enters these grooves to prevent displacement of the tube.

In Fig. 15 the construction of the tube 50 is identical to that already described. The fitting 60 through which the tube extends fits flush with the bottom of the tank and the tube extends above it into the tank. The bore 61 in the fitting is entered by a bore 62 in the nipple 63. The collar 56 closely fits the bore 61, and in the dotted position of the tube the bore 61 is closed at the top and liquid is drawn from the top of the tube. By lowering the tube collar below the port 62, the tank is drained through the bore 61. The collar 56 may also be utilized to cover the bore 62 and thus shut off the flow of liquid.

We claim:

1. In combination with a tank, an outlet fitting in the bottom of said tank, a tube extending into said tank and into said fitting, said tube having a port therein above the bottom of said tank; said tube having a second port therein, said second port being positioned within said fitting; means to adjust said tube to open said second port to drain the tank; a ring on said tube; and a spring catch rising from said outlet fitting and adapted to engage said ring to hold said tube in adjusted position.

2. In combination with a tank, an outlet fitting in the bottom of said tank, a tube extending into said tank and into said fitting, said tube having a port therein above the bottom of said tank; said tube having a second port therein, said second port being positioned within said fitting; a stop collar on said tube adapted to rest against the top of said fitting, said tube being adapted to be moved to open said second port, and yielding means engaging said collar to hold said tube with said second port open.

3. In combination with a tank, an outlet fitting in the bottom of said tank, a tube extending into said tank and into said fitting, said tube having a port therein above the bottom of said tank; said tube having a second port therein, said second port being positioned within said fitting; a stop collar on said tube adapted to rest against the top of said fitting, said tube being adapted to be moved to bring said second port out of said fitting, means engaging said tube to hold it with said second port out of said fitting; a hollow cap on the lower end of said tube and positioned within said fitting, and a knob on the outer end of said tube.

4. In combination with a tank, an outlet fitting in the bottom of said tank; a tube extending into said tank and into said fitting and having a collar adapted to rest against the top of said fitting; said tube having a port therein above the bottom of said tank; said tube having a second port therein, said second port being positioned within said fitting; said tube being adapted to be moved to bring said second port out of said fitting; means engaging said tube to hold it with said second port out of said fitting; a hollow cap having a threaded connection with the lower end of said tube and positioned within said fitting; and a knob on the outer end of said tube.

5. In combination with a tank, an outlet fitting in the bottom of said tank; a tube extending into said tank and into said fitting and having a stop collar adapted to engage said fitting; said tube having a port therein above the bottom of said tank; said tube having a second port therein, said second port being positioned within said fitting; said tube being adapted to be moved to open said second port; yielding means engaging the lower end of said tube to hold it with said second port open; a second collar on said tube adjacent the upper end thereof; and a spring bearing against said second collar to tend to urge said tube downwardly.

6. A liquid regulator for tanks, comprising a fitting in the bottom of said tank, a tube threaded at one end and adapted to extend through the top of said tank into said fitting; a hollow cap having a threaded connection with the threaded end of said tube and adapted to be received in said fitting; a stop collar on said tube adapted to engage said fitting; said tube having ports therein one of which is above the bottom of said tank and the other of which is within said fitting when said stop collar is in engagement with said fitting.

In testimony whereof, we have hereunto set our hands at Los Angeles, California, this 17th day of April, 1925.

MURRAY S. ELTON.
GEORGE EDWARD BARNHART.